United States Patent [19]

Sato

[11] 4,265,138

[45] May 5, 1981

[54] EMERGENCY BRAKE APPARATUS FOR TRACK-TYPE VEHICLE

[75] Inventor: Takayuki Sato, Suarashi, Japan

[73] Assignee: Caterpillar Mitsubishi Ltd., Tokyo, Japan

[21] Appl. No.: 44,291

[22] Filed: May 31, 1979

[30] Foreign Application Priority Data

Nov. 6, 1978 [JP] Japan .................. 53-152617[U]

[51] Int. Cl.³ ............................................. G05G 11/00
[52] U.S. Cl. .................................. 74/481; 74/520
[58] Field of Search ............... 74/480 R, 481, 512, 74/520

[56] References Cited

U.S. PATENT DOCUMENTS

| | | | |
|---|---|---|---|
| 2,504,729 | 4/1950 | Rajan | 74/481 |
| 2,513,439 | 7/1950 | Ainsworth | 74/512 |
| 2,654,260 | 10/1953 | Lewis | 74/520 |
| 2,790,522 | 4/1957 | Senkowski et al. | 74/480 |
| 2,910,557 | 10/1959 | Salzer et al. | 74/520 |
| 3,575,063 | 4/1971 | Harrom | 74/512 |
| 3,641,836 | 2/1972 | Boggs et al. | 74/512 |
| 3,731,555 | 5/1973 | Fresmann | 74/520 |
| 4,086,824 | 5/1978 | Johnson | 74/512 |

FOREIGN PATENT DOCUMENTS 505452  5/1920  France ........................... 74/481

OTHER PUBLICATIONS

Rappaport, "16 Latch, Toggle & Trigger Devices", *Product Engineering*, May 1957, pp. 200–201.

*Primary Examiner*—Lawrence J. Staab
*Attorney, Agent, or Firm*—Richard F. Phillips

[57] ABSTRACT

Emergency brakes in track-type vehicles are usually applied by actuating either foot pedals or a hand brake, or both. The present invention provides an emergency brake which can stop and hold the vehicle due to movement of a single pedal (45) without the need to operate any other controls (16) on the vehicle.

6 Claims, 2 Drawing Figures

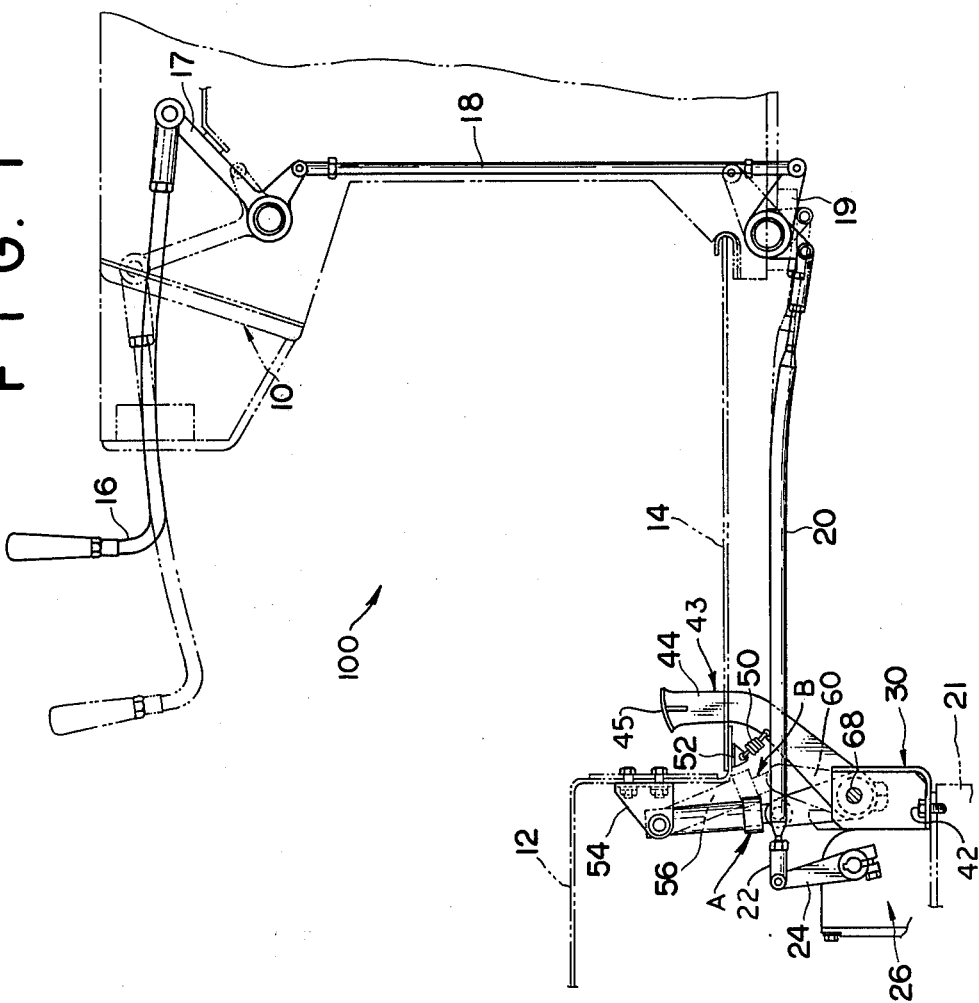

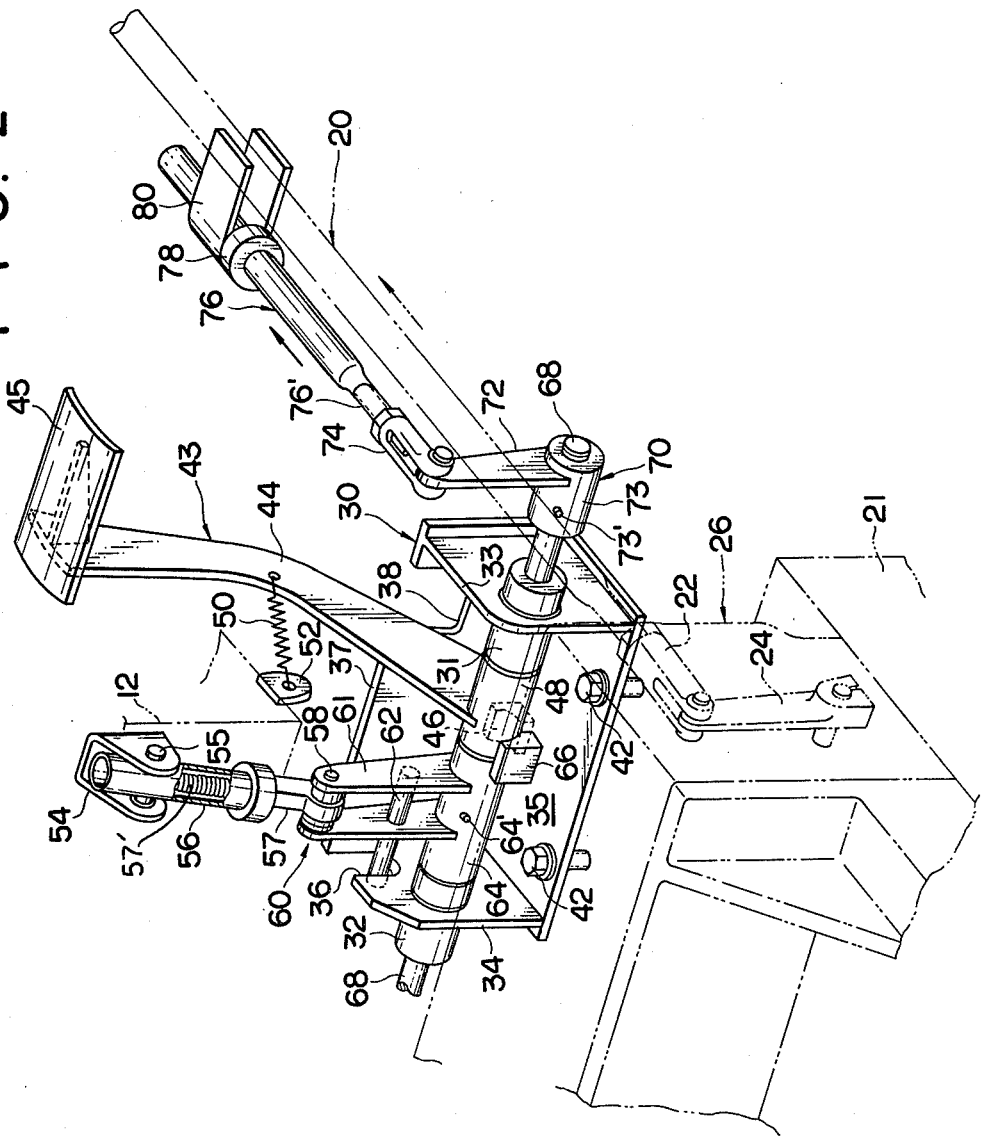

EMERGENCY BRAKE APPARATUS FOR TRACK-TYPE VEHICLE

TECHNICAL FIELD

This invention relates generally to brakes and more particularly to fluid and mechanical operators for vehicle brakes.

BACKGROUND ART

Conventionally, track-type vehicles include left and right hand control levers which actuate steering clutches provided to open or close brake control valves on the vehicle. These levers are operated by being pulled toward the operator.

Pulling the control levers is only effective for stopping the vehicle temporarily and not for locking the brakes. To hold the vehicle in a stopped position, the operator must actuate either foot pedals or a hand brake so as to apply the parking brakes. Such procedure is complicated and time-consuming. Particularly, in an emergency, such time-consuming procedure could amplify the situation.

In view of the above, it would be advantageous to provide an emergency brake which can be operated to maintain the vehicle in stopped position without the need to actuate other hand or foot-operated controls which overcomes the problems associated with the prior art.

Disclosure of Invention

In one aspect of the present invention, the problems pertaining to the known prior art, as set forth above, are advantageously avoided.

This is accomplished by providing an emergency brake apparatus including a valve for actuating brakes, a rotary member connected to the valve, a brake member pivotally mounted on the rotary member, and means for locking the brakes.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

FIG. 1 is a view illustrating the operation of an emergency brake system according to the present invention; and FIG. 2 is a perspective view further illustrating the emergency brake system of FIG. 1.

BEST MODE FOR CARRYING OUT THE INVENTION

A conventional brake mechanism for a steering system is generally designated 100, FIG. 1. There are provided on a dash board 10 a pair of left and right control levers 16. For simplicity, only the right control lever 16 and associated system is shown and described since the left and right sides are similar. Lever 16 is connected to a bell crank 17, a connecting rod 18, a bell crank 19 and to a first control rod 20. First control rod 20 is linked through the medium of an adjusting clevis 22 to a lever 24 attached to a control valve 26 of the steering system 100. Valve 26 is mounted on a steering clutch casing 21. Control valve 26 incorporates a return spring (not shown) to resist the clockwise pivotal movement of lever 24 upon releasing the brakes. When an operator desires to stop a vehicle, the operator pulls lever 16 to a position shown in phantom outline. This operation displaces first control rod 20 to the right as viewed in FIG. 1. Displacement to the right of first control rod 20 causes a clockwise pivotal movement of lever 24 against the force of the spring (not shown). Consequently, steering control valve 26 is brought to an open position, thereby allowing a supply of pressurized oil to actuate a brake circuit (not shown), thus applying the brakes as is well known. An emergency brake apparatus according to the present invention includes an associated foot brake member 43 solely for emergency use in cooperation with the conventional steering system 100. Brake member 43 is connected with steering system 100 to apply the same braking action as that applied by the pair of left and right control levers 16.

A U-shaped actuating piece 80 is fixedly secured to rod 20 by a known technique, such as by welding. A second control rod 76, extending parallel to rod 20, is slidably inserted through actuating piece 80. A connecting member 78, in the form of flange, is rigidly secured to second control rod 76 in abutting relation with one edge of actuating piece 80, so that when brake member 43 is actuated and second control rod 76 is moved to the right, as viewed in FIG. 2, connecting member 78 urges, by way of actuating piece 80, first control rod 20 to the right also. When first steering control rod 20 returns to the left as viewed in the Figure, actuating piece 80 urges, by way of member 78, second control rod 76 to also return to the left.

A first link member 70 is coupled through the medium of clevis 74 to one end 76' of second rod 76, respectively. First link member 70 includes a lever 72 pivotally carried by clevis 74, and a tubular link boss 73 fixedly connected to lever 72. First link member 70 is fitted on an end of a rotary member such as shaft 68 extending below and across a floor plate 14 of an operator's station. Member 70 is fastened by stop pin 73' to shaft 68 to rotate therewith. A box-type bracket 30, for carrying rotary shaft 68, is connected to casing 21 by bolts 42.

Box-type bracket 30 consists of a reversed L-shaped bottom plate 35 and first and second bracket plates 33 and 34 attached to opposite ends of bottom plate 35 in spaced relation to each other. First and second bracket plates 33 and 34 have holes for receiving tubular bosses 31 and 32, respectively, which in turn are fitted on rotary shaft 68. Foot brake member 43 is attached to a tubular boss 48 which, together with another tubular boss 64 of a second link member 60, is rotatably fitted on a portion of rotary shaft 68 between tubular bosses 31 and 32. Foot brake member 43 includes a first block means 46 formed on the outer peripheral surface of tubular boss 48, and includes a brake lever 44 attached at one end to the outer peripheral surface of tubular boss 48 and having a pedal 45 at the other end thereof. Lever 44 with pedal 45 projects from floor plate 14 so that the pedal is positioned in close proximity to a foot of an operator adjacent seat support plate 12. A first biasing means 50, namely a spring, is fixed at one end to substantially a midpoint of lever 44 and secured at the other end to a bracket 52 attached to floor plate 14 of the operator's station. Spring 50 is of a construction sufficient for having a spring force strong enough to resist an unimposed clockwise pivotal movement of foot brake member 43 as viewed in the Figures. In order to allow an imposed clockwise pivotal movement of second brake lever 44, a groove 38 is provided in a plate 37 of box-type bracket 30.

The second link member 60 has link arms 61 fixed on a boss 64 and pivotally supported on rotary shaft 68. Boss 64 includes a second block means 66 formed on the outer peripheral surface of a tubular boss 64 overlapping but not connected to boss 48. Link 60 is secured at one end to the outer peripheral surface of boss 64 and a biasing means 56 is pivotally connected to the other end of link 61 by a pivot pin 58. Boss 64 is connected to rotate with shaft 68 due to pin 64'. Biasing means 56 includes a rod 57 adapted to expand and contract by means of a spring 57' connected thereto for imposing a compressive force on link 60 at pin 58.

A lock pin 62 extends through the mid portion of link 60. One end of the pin engages the edge of a groove 36 provided in bracket plate 34 of box-type bracket 30, thereby limiting the counterclockwise movement of link member 60 by the action of biasing means 56. Block 46 on boss 48 is positioned to move relative to block 66 and then to abut block 66 on boss 64 when brake member 43 is pivotally moved clockwise by an external force thus urging link member 60 in a clockwise direction. As link member 60 is moved clockwise, rotary shaft 68 is rotated clockwise, whereby first link member 70 is moved clockwise, thereby shifting second control rod 76 to the right. Biasing means 56 connected at one end to the upper end portion of link 60 is pivotally supported by a pivot pin 55 which, in turn, is inserted in a bracket 54 rigidly secured to operator's seat support 12. Link 60 and biasing means 56 are shown in a first position designated A, FIG. 1. When link 60 is pivotally moved clockwise by an external force, the biasing means 56 is also urged counterclockwise and the force of compressed spring 57' will lock biasing means 56 and link 60 in a second position designated B in the dotted line position as shown in FIG. 1 in a brakes-locked position. Counterclockwise movement of member 43 will unlock the brakes.

It will be understood that the emergency brakes of the present invention do not interfere with the usual steering operation and braking action by means of control levers 16. When control lever 16 is operated to displace first control rod 20 to the right, there is no corresponding displacement of rod 76. This is because, as aforesaid, actuating piece 80 is fixed to rod 20 and is slidably connected to rod 76 so that the usual steering operation and braking action are accomplished independently of the emergency brakes. That is, actuation of brake member 43 will actuate levers 16 but, actuation of levers 16 will not actuate brake member 43.

Industrial Applicability

In operation, when an operator treads on foot pedal 45 in order to apply emergency brakes to a vehicle, brake member 43 is pivotally moved clockwise against the force of first spring 50. First block means 46 is moved clockwise engaging second block means 66 whereby second link member 60 is pivotally moved clockwise about rotary shaft 68. As a result of the clockwise movement of link member 60, biasing means 56 is pivoted to a brakes-locked position shown by dotted line (position B) in FIG. 1. This position will be maintained due to the force of compressed spring 57' acting on link 60 at pin 58.

Normal steering-braking operation of a vehicle is intact by operation of either or both levers 16. Emergency braking operation is effected by foot pressure applied to pedal 45 of brake member 43. Since emergency braking through use of brake member 43 locks the brakes, this invention provides a quick one-motion braking and locking action to stop and hold a vehicle and, if necessary, permit the operator to abandon the vehicle.

The foregoing has described an emergency brake apparatus operable independently of other brake on a tracktype vehicle.

Other aspects, objects and advantages of this invention can be obtained from a study of the drawings, the disclosure and the appended claims.

I claim:

1. An auxiliary braking apparatus for a vehicle providing a second means of activating main braking systems which have a first rod (20) movement of which activates and deactivates the brakes, comprising:
   a rotary member (68) axially fixed on said vehicle;
   a brake member (43) rotatable about said rotary member (68);
   means (56,60) for locking said brake member (43) in one of two operating positions, a totally activated position and a deactivated position, so as to be free from movement until an external force is applied, and so as to ensure that only total activation and total deactivation of said auxiliary braking apparatus can occur, with spring means (57') for ensuring swift attainment of said activated position;
   a second rod (76) connected to said brake member (43) such that movement of said brake member (43) to said activated position causes movement of said second rod (76); and,
   means (78,80) interconnecting said second rod (76) and said first rod (20) such that movement of said brake member (43) to said activated position causes brake activating movement of said first rod (20).

2. The auxiliary braking apparatus of claim 1 wherein said means (78,80) interconnecting said second rod (76) and said first rod (20) provide that initial movement of said first rod (20) to a brakes activated position induces no movement of said second rod (76) and movement of said first rod (20) to a brakes deactivated position from a brakes activated position will cause movement of said second rod (76) and said brake member (43) to deactivated positions if initially in a brakes activated position.

3. The auxiliary braking apparatus of claim 1 in which said first rod (20) controls a valve (26) for activating fluid operated brakes.

4. The auxiliary braking apparatus of claim 1 with said means (56,60) for locking said brake member (43) being connected to said rotary member (68) for concerted movement therewith and having connected thereto a link member (60) urging at a pivot (58) a biasing member (56) between a first and a second position.

5. The auxiliary braking apparatus of claim 1 in which said means (56,60) for locking said brake member (43) is of the over-center locking mechanism type, having in a protected compressed state said spring means (57').

6. The auxiliary braking apparatus of claim 1 in which:
   said brake member (43) is connected to a tubular boss (48) through which said rotary shaft (68) passes, said tubular boss (48) being rotatable about said rotary shaft (68);

means (46) connected to said tubular boss (48) urges said means for locking said brake member (43) into a brakes fully activated position upon application of said brake member and causes said rotary shaft (68) to force said second rod (76) to a brakes fully activated position resulting in travel of said first rod (20) causing total activation of said brakes; and means (56,60,78,80) for simultaneously restoring to a fully deactivated position said brake member (43), said means (56,60) for locking said brake member (43), and said second rod (76) upon deactivation of said main brake system.

* * * * *